No. 655,945. Patented Aug. 14, 1900.
E. E. ZIEGLER.
BACK PEDALING BRAKE.
(Application filed May 19, 1900.)
(No Model.)
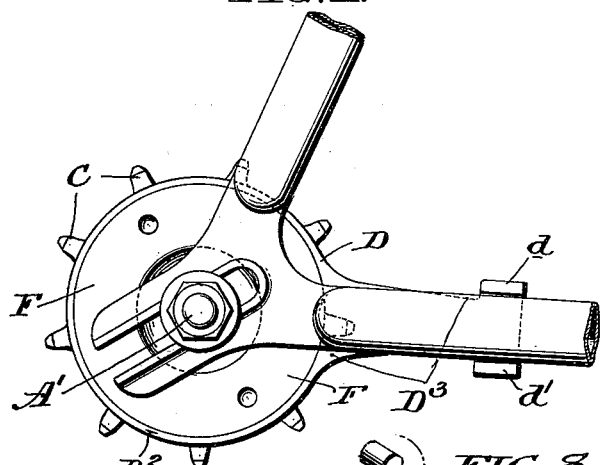
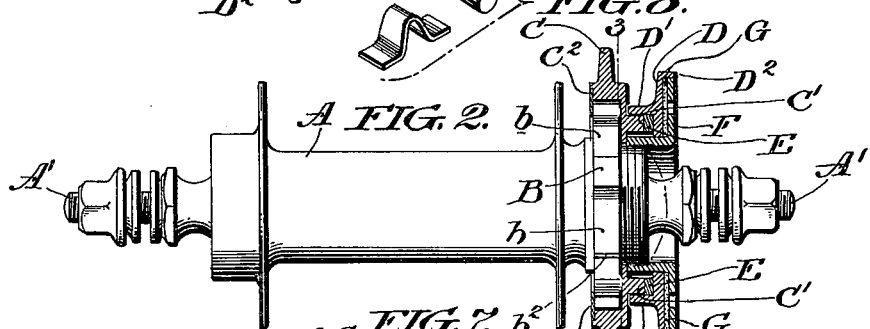
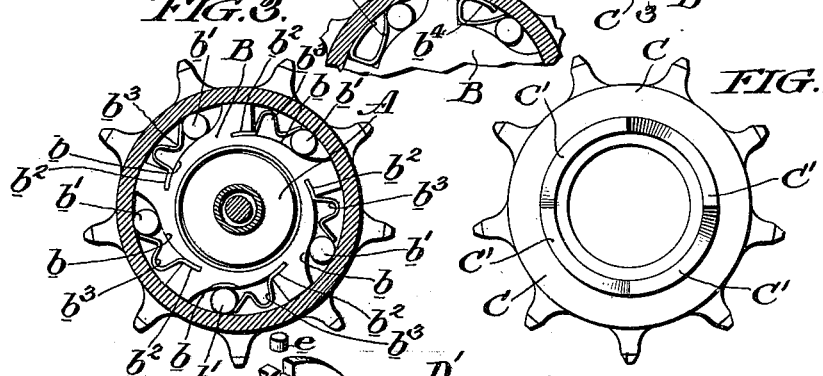
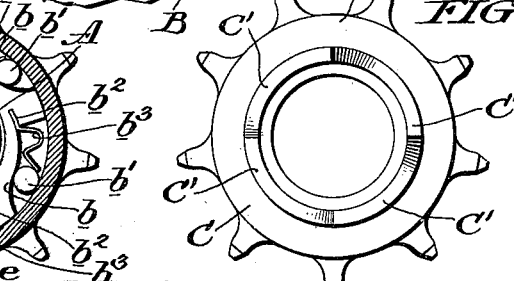
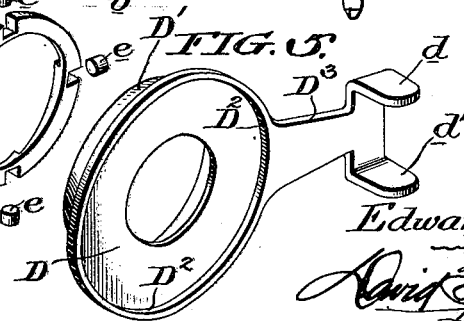
WITNESSES:
Wilson Wallack
H. D. Blackwood
INVENTOR
Edward E. Ziegler
by
David S. Williams
Atty.

UNITED STATES PATENT OFFICE.

EDWARD E. ZIEGLER, OF PHILADELPHIA, PENNSYLVANIA.

BACK-PEDALING BRAKE.

SPECIFICATION forming part of Letters Patent No. 655,945, dated August 14, 1900.

Application filed May 19, 1900. Serial No. 17,204. (No model.)

*To all whom it may concern:*

Be it known that I, EDWARD E. ZIEGLER, a citizen of the United States of America, and a resident of No. 4333 Germantown avenue, in the city and county of Philadelphia, State of Pennsylvania, have invented certain new and useful Improvements in Brakes for Bicycles and other Vehicles, of which the following is a specification.

My invention relates to improvements in pedal-brakes for bicycles; and it consists, mainly, in the details of construction and arrangement of the parts of that particular class of pedal-brakes shown and described in my allowed application, filed May 25, 1899, Serial No. 718,165.

My invention relates more specifically to the clutch mechanism applied to the hubs of the driving-wheels of bicycles by which the sprocket-wheel may be disengaged from the hub by retarding or entirely checking its motion and, further, in devices by which the motion of the hub is retarded or entirely checked by a reversal of the movement of the sprocket-wheel. It will be understood that the special form of clutching device hereinafter described being complete in itself may be used independently of the brake mechanism in such cases where it is desired to use the ordinary form of brake as applied to the front wheel of a bicycle; but in most cases I prefer to use the same in conjunction with the form of brake hereinafter described, and pointed out in the drawings.

In the accompanying drawings, forming part of this specification, Figure 1 represents a side elevation of a portion of the framework of a bicycle, showing the rear-wheel hub and sprocket-wheel secured in position. Fig. 2 illustrates a rear view of the hub with the sprocket-wheel and brake mechanism in section. Fig. 3 shows a sectional view of the sprocket-wheel and axle, taken on line 3 3 of Fig. 2. Fig. 4 illustrates a side view of the sprocket-wheel detached from the hub as viewed from the right-hand side of Fig. 2. Fig. 5 represents a detached perspective view of the brake-shoe. Fig. 6 illustrates a perspective view of the spacing-ring and rollers adapted to the brake-shoe. Fig. 7 represents a sectional view, similar to Fig. 3, of a small portion of the sprocket-wheel and hub with a modified form of spring for operating the clutch-rollers; and Fig. 8 illustrates a detached perspective view of the preferred form of spring and clutch-roller, as shown in operative engagement in Fig. 3.

Referring to the reference-letters, which indicate similar parts throughout the drawings, A represents the hub of the rear wheel of a bicycle, which is mounted upon a stationary axle A'.

B represents the clutch-disk, secured to the hub and provided with a series of peripheral inclines $b$ to receive the clutch-rollers $b'$ and with slots $b^2$ for holding springs $b^3$, which retain the rollers by a slight tension in an operative or wedged position. Mounted upon the clutch-disk is a sprocket-wheel C, which has formed upon one side a series of inclines C' and which is held in position upon the clutch-disk by a ring $C^2$.

D represents the brake-shoe, made in the form of a disk having flanges D' and $D^2$, the former receiving and encircling the spacing-ring E, the rollers $e$, and the inclines C' of the sprocket-wheel and the latter receiving the ring F, the inner portion of which is securely threaded to the hub A. The brake-shoe may, if desired, be fastened to the framework of the bicycle by a pin or projection; but I prefer to use, as shown in Fig. 5, a short arm $D^3$, secured to or forming part of the disk D and provided with projections $d$ and $d'$, which engage a portion of the frame of the bicycle, as shown in Fig. 1.

Between the brake-shoe D and the ring F I prefer to use a fiber washer G, which takes the wear when the brake is applied and serves to prevent an undue heating of the metallic parts D and F, which would occur if these parts were brought into frictional contact.

The most important feature of my invention resides in the construction and arrangement of the springs $b^3$ and clutch-rollers $b'$, the former being arranged in the shape of a loop having projecting ends, one of which enters a slot and holds the spring in position, while the other bears upon the roller at a point above the center of rotation, thus assisting by its inclination in turning the roller and causing it to be more quickly and more firmly wedged between the inclined portion of the disk and the inner surface of the sprocket-wheel when the driving-wheel is driven forward and to prevent the rollers from being displaced or disengaged from the controlling action of the sprocket-wheel when the driving-wheel is turned in the opposite direction.

In Fig. 7 I have shown a slight modification of spring in which case the slots $b^2$ shown in Fig. 3 are dispensed with, the spring, which I shall denote as $b^4$, being confined between the inclined surface of the clutch-disk and inner wall of the sprocket-wheel by its own tension, one end of the spring bearing upon the roller in such a manner as to cause it to more readily turn into a locking position.

Having described my invention, what I claim, and desire to secure by Letters Patent, is—

1. A back-pedaling brake, comprising a wheel-hub provided at one end with a series of circumferential inclines, rollers adapted to said inclines, a sprocket-wheel encircling the hub and forming a bearing for the rollers, and having a hub formed upon the opposite side provided with oppositely-arranged inclines, loop-shaped springs interposed between the wheel-hub and sprocket-wheel having inclined ends adapted to engage the rollers, a cup-shaped disk inclosing the hub of the sprocket-wheel and rollers interposed between the disk and hub.

2. A back-pedaling brake, comprising a wheel-hub, a clutch-disk mounted thereon provided with inclines, rollers adapted to said inclines, leaf-springs adapted to act upon the balls, a sprocket-wheel forming a bearing for the balls, having a hub provided with oppositely-arranged inclines, rollers adapted to the said inclines, a spacing-ring, a cup-shaped disk, inclosing the inclines of the hub and forming a bearing for the rollers substantially as specified.

3. A device of the character specified comprising a wheel-hub, a disk mounted thereon provided with circumferential inclines, rollers adapted to said inclines, a leaf-spring adapted to engage the rollers, a wheel encircling said disk and forming a bearing for the rollers, said sprocket-wheel having a hub provided with oppositely-arranged inclines, rollers, adapted to said inclines, a spacing-ring, a disk having a bifurcated extension to engage the framework of a bicycle and having also a cup-shaped portion surrounding the hub of the sprocket-wheel, a ring threaded to the hub and adapted to hold the disk in position and a fiber washer interposed between said ring and disk.

Signed by me at Philadelphia, Pennsylvania, this 23d day of January, 1900.

EDWARD E. ZIEGLER.

Witnesses:
WALTER C. PUSEY,
DAVID S. WILLIAMS.